Jan. 30, 1940.  P. B. STREANDER  2,188,847
APPARATUS FOR AND METHOD OF TREATING SEWAGE SLUDGE AND THE LIKE
Filed March 12, 1936   3 Sheets-Sheet 1

INVENTOR:
PHILIP B. STREANDER
BY Louis L. Ansart
his ATTORNEY.

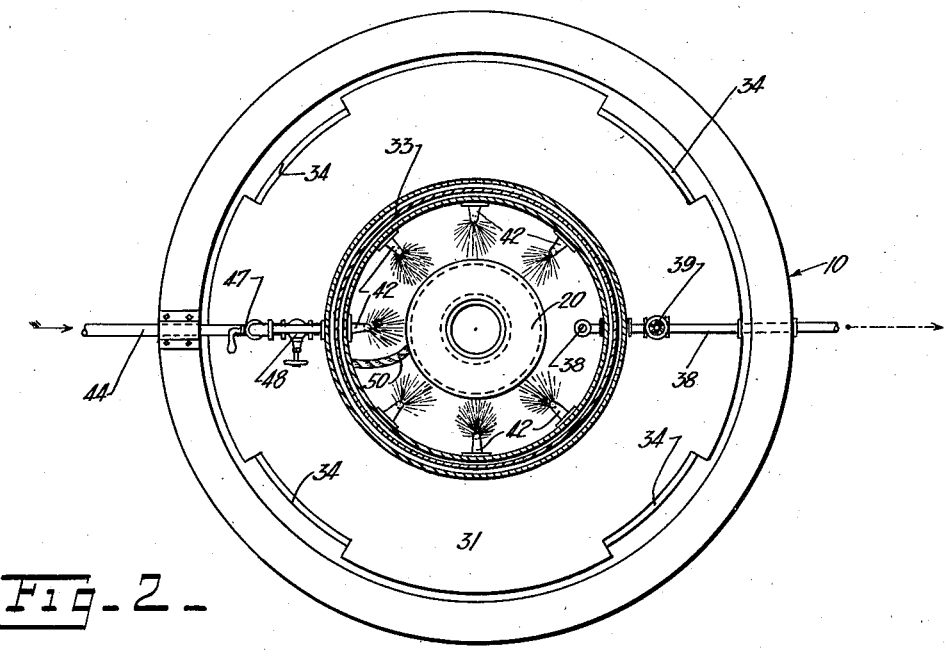
Fig-2-
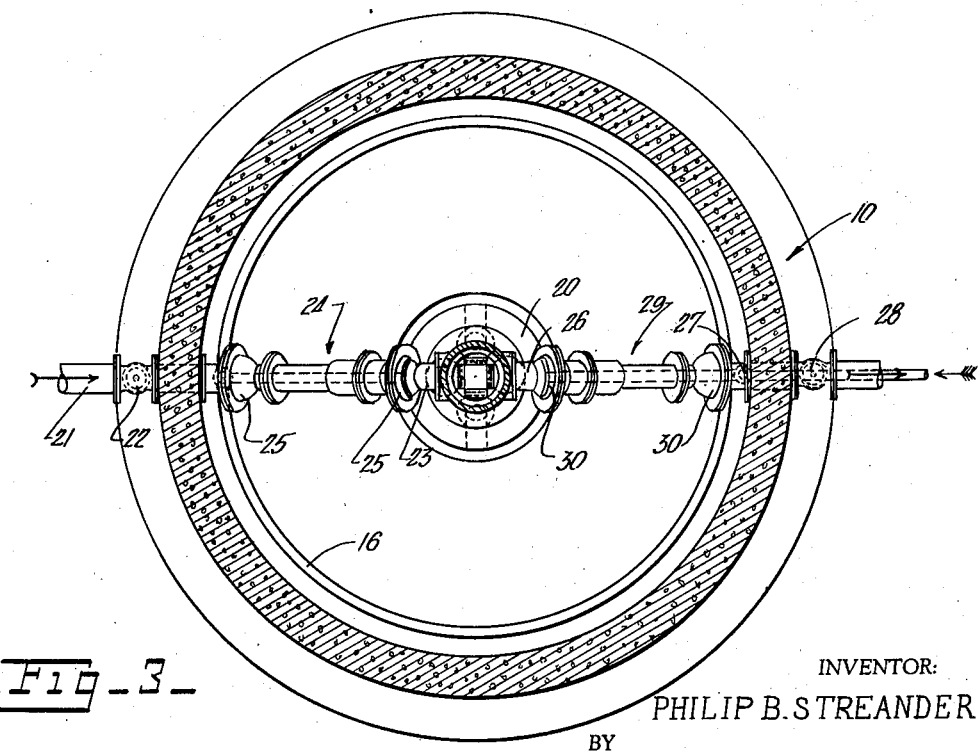
Fig-3-
INVENTOR:
PHILIP B. STREANDER
BY
Louis L. Ansart
his ATTORNEY.

PHILIP B. STREANDER
INVENTOR.

BY
his ATTORNEY.

Patented Jan. 30, 1940

2,188,847

UNITED STATES PATENT OFFICE 2,188,847

APPARATUS FOR AND METHOD OF TREATING SEWAGE SLUDGE AND THE LIKE

Philip B. Streander, Maplewood, N. J., assignor to Municipal Sanitary Service Corporation, New York, N. Y., a corporation of New York Application March 12, 1936, Serial No. 68,409

15 Claims. (Cl. 210—2)

The present invention relates to apparatus for and methods of treating sewage sludge and the like and more particularly to features relating to the heating and circulation of the material under treatment.

Important objects of the invention relate to the provision of novel and advantageous apparatus and methods for producing the desired results. An important feature of the invention relates to the combination of the heating and circulation elements into one immovable structure thereby reducing materially the cost of equipment required for effective digestion of the material treated.

The importance of temperature in the digestion of sewage solids has been repeatedly emphasized during recent years. It is well known that with low temperatures the rate of digestion is extremely slow, but that as the temperature is increased the rate is correspondingly increased. Various temperatures in digestion tanks develop various types of organisms which are most active at the temperature maintained. Once the balanced flora is established by balanced temperature in the tank, the activities are balanced and digestion proceeds uniformly. It is influenced by the introduction and distribution of the food contained in the incoming raw or undigested sludge. Should the temperature be lowered, those organisms active at the higher temperature either become inactive or are killed at the lower temperature. Time must elapse until the organisms active at the lower temperature become active and digestion proceeds again, however at a decreased rate.

The usual method of heating sludge digestion tanks consists of the circulation of warm water through coils placed inside the tank. Experience has demonstrated that this method is well applicable to lower temperatures (70 degrees F. to 80 degrees F.) where the temperature of the heating water is only at an average of about 110 degrees F. and incrustations form slowly. With higher water temperature, required for increased sludge temperature, it is highly probable that incrustation of sludge on the exterior of the pipe coils will be far more rapid. Sludge is in a practically quiescent state around the surface of the pipes and the only action is that of the slow movement of the warmed liquor as it passes over the coils. It is also practically impossible so to space the heating coils that a uniform temperature can be maintained in the tank. The coils are usually placed in the bottom or the side walls of the tank, and thermal circulation of the liquor contained in the sludge, is depended upon to transmit heat to the contents of the entire tank.

Another method of heating sludge digestion tanks involves the introduction of hot water or heated sewage mixed with the raw sludge in a volume sufficient to raise the temperature of the raw sludge to that of the digestion tank. Rough calculation will quickly indicate that unduly large volumes of heated liquor must be added. This takes up valuable space in the digestion tank otherwise available for digestion, and must later be withdrawn from the tank as liquor and subsequently treated or returned to the incoming raw sewage. In either case there is a waste of heat. This is an economic loss as the heat could be utilized for other purposes.

Digestion is, in the light of present knowledge, one of the most effective and the least expensive methods of disposing of the objectionable sludge removed from the sewage. Digestion of sludge is a very complicated process as yet only partially understood. Generally the process of digestion is induced by the anaerobic bacteria, acting directly or by means of their enzymes, which break up the proteins into fatty acids of their salts and split these compounds finally into methane and carbonic acid. The water content in the digestion tank plays a definite part in the formation of sludge gas, the water entering into the reaction which results in the splitting of fatty acids into methane and carbon dioxide. The solubility of sludge water for the spit off or secreted gases, increases with the depth of the sludge. The comparatively small amount of water in the bottom of the tank quickly becomes saturated with carbon dioxide and the methane bacteria cannot function properly in an acid medium created by their own secretions. The lowest water content of sludge which will allow unrestricted bacterial action is not accurately known, but it is certain that the available water should be distributed through the full mass so that every sludge particle is surrounded by water. It is therefore essential that some means be provided for the removal of this carbon dioxide saturated liquor. This can probably be best effected by circulation of sludge.

Sludge is agitated for various requirements. It is a well known fact that stirring or agitation tends to concentrate sludges, thereby securing better and more positive separation of the sewage liquor and the sludge. The usual acid reaction of the entering raw sludge must be neutralized and simultaneously seeded with effective methane bacteria. Accumulations of acid decomposition products, must be dispersed throughout the body of the tank so that they may become neutralized and a uniform pH maintained. It is also necessary to prevent the formation of an excessive layer of scum on the surface as this interferes with the drawing off of the sewage liquor. Heavy deposits of thick sludge on the bottom of the tank interfere with proper sludge draw-off and also take up valuable sludge space. It is also desirable to break up the coarser sludge particles into smaller aggregates with a higher specific gravity. All of these requirements are more or less interlocking and automatically occur with some degree in all digestion tanks, but can be greatly accelerated by mechanical agitation and circulation. Sludge agitating and circulating mechanisms should always work under water and the tanks should be so constructed that air will be excluded.

The present invention combines the functions of heating and circulation of the sludge in one mechanism. The arrangement proposed serves to keep the liquid portion of the sludge in constant circulation and the same mechanism which causes circulation of the sludge also serves to provide the heat necessary to maintain the sludge at its predetermined temperature for the optimum digestion of the organic constituents in the sludge. By circulation the liquid, saturated with carbon dioxide, moves from the bottom of the tank upward through the circulating pipe where this is heated thereby accelerating the discharge of the carbon dioxide gas into the gas space above the sludge, from which it is subsequently withdrawn with the methane gas generated by the decomposing organic matter. Further the circulation of the sludge liquor within the tank serves to mix effective methane bacteria with the incoming raw sludge thereby effectively seeding the sludge and accelerating its digestion.

In carrying out the invention, a sludge digestion tank may be provided, preferably at its center, with a stationary lower pipe receiving sludge from the tank and an upper movable pipe movably connected with the lower pipe. Preferably the upper pipe has a telescopic connection with the lower pipe and the top of the upper pipe is maintained substantially level with the surface of the sludge in the tank by means of a float. Upward circulation through these pipes may be obtained by maintaining the liquor in the stationary pipe at a higher temperature than the liquor at the outside, as by use of a hot plate at the bottom of the stationary lower pipe where the sludge or liquor enters the pipe past flap valves which prevents a reverse flow. Collection of gas may be effected by means of a floating gas cover of smaller diameter than the tank. The gas may be directed to said floating cover by baffles or deflectors which serve to prevent the escape of gas into a surrounding supernatant liquid chamber. At the underside of the floating gas cover there may be provided a series of spray nozzles for use in breaking down any scum accumulating on the surface of the liquid in the tank. The raw sludge may be introduced directly into the movable pipe and the digested sludge may be removed directly from the movable pipe or the raw sludge may be introduced at the side of the tank and digested sludge may be removed directly from the bottom of the tank.

It will be evident that by heating the liquid in the central pipe or draft tube circulation of the liquid and heating thereof may be accomplished in a very economical and effective manner.

Other features, objects and advantages will appear upon consideration of the following detailed description and of the drawings in which:

Fig. 2 is a section on the line 2—2 of Fig. 1;

Fig. 3 is a section on the line 3—3 of Fig. 1;

Figure 1:
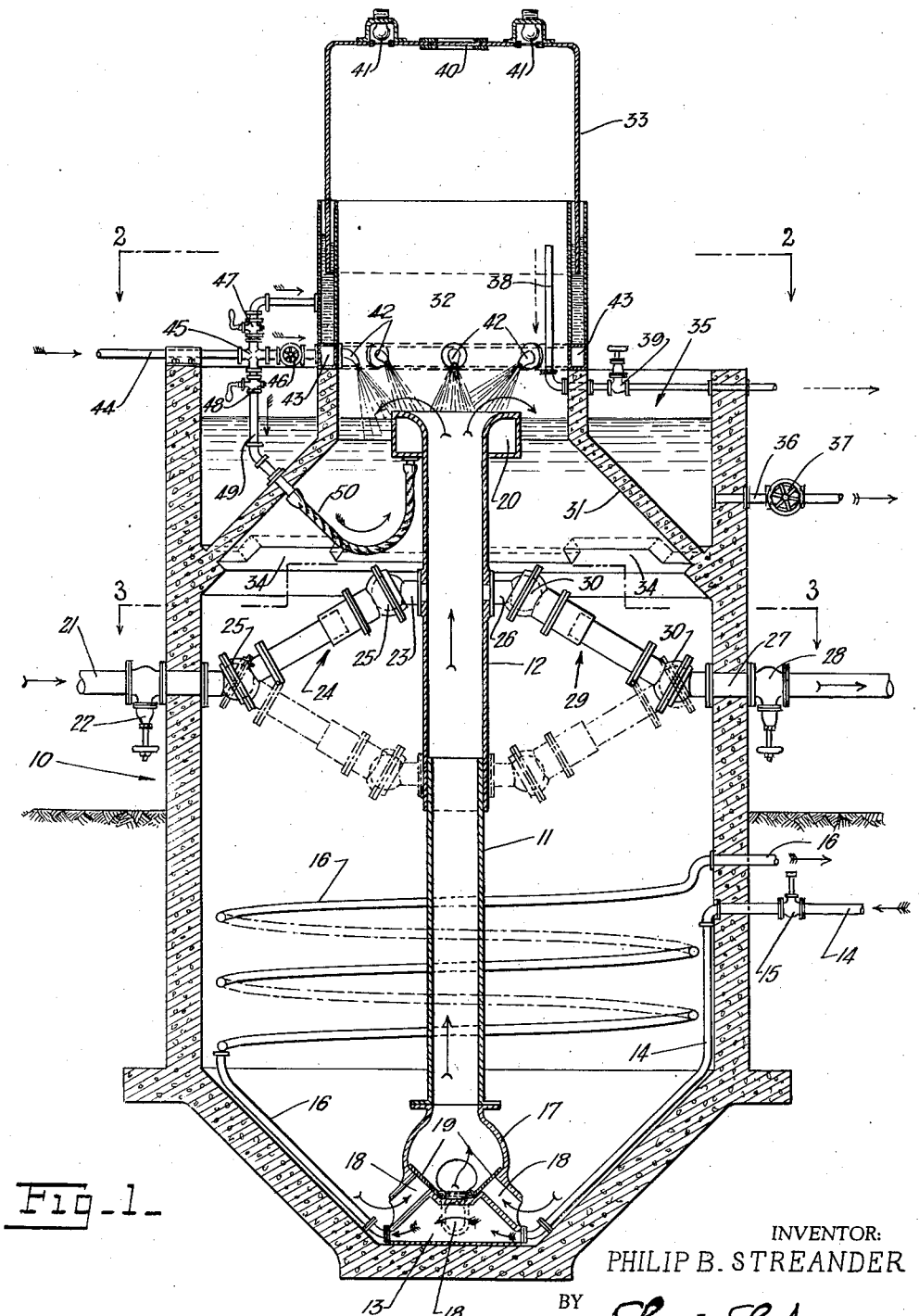
Fig. 1 is a section through the vertical axis of an apparatus embodying a preferred embodiment of the invention.

As illustrated in Figs. 1, 2 and 3, the apparatus includes a digestion tank 10 in which thermal circulation, to lift seeding liquid or sludge from the bottom of the tank to the surface of the liquid therein for mixing with incoming sludge, is produced, through a stationary lower pipe 11 and a movable upper pipe 12 having a telescopic connection with the lower pipe, by means of a hot plate 13 at the lower end of the stationary pipe. Said hot plate 13 may be in the form of a hollow member receiving hot water through a pipe 14 controlled by a valve 15, and discharging the rotater through a pipe 16. The pipe 16 may be formed with heating coils extending upwardly into the tank and finally dicharging through the side of the tank 10. Resting on the hot plate 13 and supporting the stationary lower pipe 11 is a hollow fitting 17 supplying to the pipe 11 liquid entering through inlets 18 past flap valves 19 which prevent reverse flow. At its upper end the movable upper pipe 12 is provided with a float 20 serving to maintain the upper end of the pipe substantially level with the surface of the sludge in the tank.

Raw sludge may be supplied to the interior of the movable pipe 12 through a pipe 21 extending through the wall of the tank and controlled by a valve 22, a pipe 23 secured to the movable pipe 12, and a telescopic pipe assembly 24 connected with pipes 21 and 23 by means of universal connections 25. The digested sludge may be discharged from the movable pipe 12 through a pipe 26 projecting from the movable pipe 12, a pipe 27 passing through the wall of the tank and provided at the outside with a valve 28, and a telescopic pipe assembly 29 connected with the pipes 26 and 27 by universal connections 30.

The gas generated in the digesting process rises to the top and may be directed by suitable means such as a deflector or baffle 31 into a receptacle 32 having a hollow peripheral wall receiving the peripheral wall of a floating gas cover 33 and containing water which provides a gas seal. Preferably the deflector is in the general form of a hollow frustum of a cone and is provided at its base with openings 34 through which the supernatant liquid passes to an open top supernatant liquid chamber 35 from which the liquid may be discharged through a pipe 36 passing through the side wall of the tank and controlled by a valve 37. Gas in the floating top or cover 33 may be removed through a pipe 38 controlled by a valve 39, one part of the pipe extending upwardly into the floating cover to receive the gas and another directing the gas to any desired point. Preferably the floating cover is provided with a plate glass inspection window 40 and with one or more gas-tight lighting units 41.

Any scum accumulating on the surface of the liquid in the tank may be broken down by liquid from spray nozzles 42 below the floating gas cover 33, said liquid being supplied preferably from an annular chamber 43 just below the hollow wall portion receiving the lower edge of the floating cover 33. Water may be supplied to these two parts by means of a water supply pipe 44 connected with one branch of a four-way fitting 45, the opposite branch being connected through a valve 46 to the annular chamber 43 supplying water to the nozzles 42 and a third branch connected through a valve 47 with the interior of the hollow wall receiving the lower edge of the floating cover 33.

The remaining or lower branch of the fitting 45 may be connected through a valve 48, pipe 49 and armored hose 50 with the interior of the float 20 so that by admitting water to the float the upper end of the movable pipe 12 may be brought down closer to the level of the liquid in the tank and by withdrawing water from the float the movable pipe may be brought to a higher position with reference to the liquid level in the tank. The float 20 may of course be provided with suitable air vents and inlets.

The peripheral wall of the tank may be insulated in any suitable way against heat losses, as for example by earth filled in around the tank.

In operation the raw sludge enters the tank 10 through the inlet pipe 21 and passes into the movable pipe 12 through the telescopic connection 24. There is however, a slow upward flow of tank liquid from the stationary pipe 11 due to heating the hot plate 13 by hot water supplied through the pipe 14. Downward flow of liquid through the stationary pipe 11 is prevented at all times by the flap valves 19. Heat losses through the peripheral wall of the tank 10 may be compensated for by passing the water through coils adjacent to the peripheral wall. The raw sewage will therefore be mixed with treated sludge from the bottom or lower part of the tank and passed upwardly to the top of the movable pipe 12 and therefrom to the surface portion of the tank liquid. Bacterial action takes place in the tank and not only breaks down sludge solids but generates gas which works to the surface of the liquid and is connected in the floating cover 33 from which it may be discharged through pipe 38. Digested sludge from the bottom of the tank is passed upwardly through the stationary pipe 11 to the level of the inlet 23 and outlet 26 of the movable pipe 12, part of the digested sludge passing out through said outlet and the rest being mixed with the raw sludge from the inlet 23 and passed upwardly through movable pipe 12. In this way the raw sludge is seeded with bacteria in the movable pipe 12 and then passed into the tank liquid. In all cases the solids will tend to settle and the resulting supernatant liquid will pass through openings 34 into the supernatant liquid chamber 35 and will eventually be discharged therefrom through pipe 36. Scum forming on the surface of the liquid will be broken up by sprays of water from nozzles 42.

Figures 4, 5:
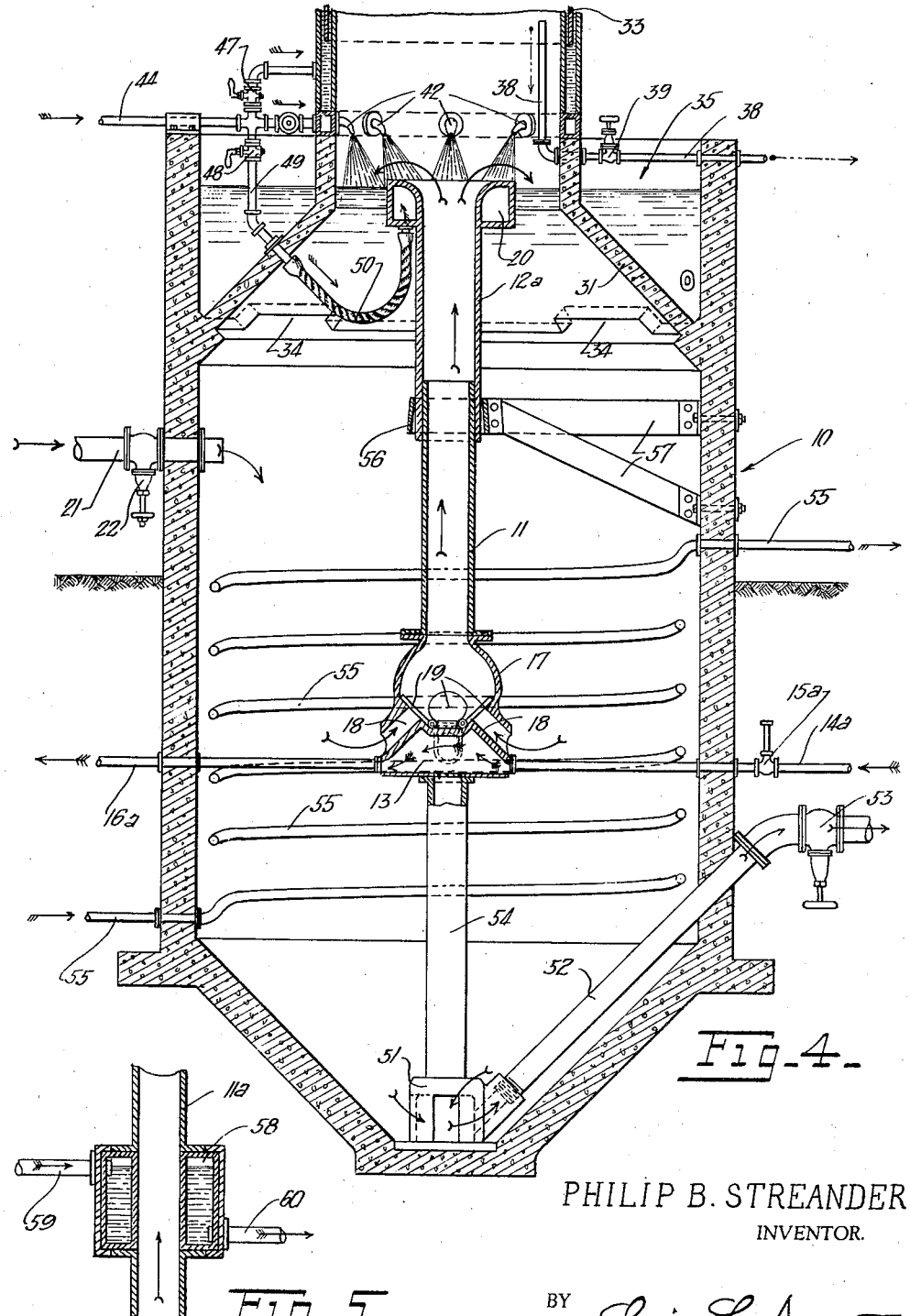
Fig. 4 is a section, similar to Fig. 1, of a modified form of the apparatus.
Fig. 5 is a detail sectional view illustrating means for heating the liquid in the pipes.

In Fig. 4, there is illustrated a second form of apparatus similar in most respects to that shown in Fig. 1. In this second form of apparatus, the inlet pipe 21 discharges directly into tank 10 and the digested sludge passes into a cage 51 at the bottom of the tank and is discharged from the tank through a pipe 52 controlled by a valve 53. Also the hot plate 13 is supported above the cage 51 by suitable means such as a standard 54 resting on the cage 51. Resting on the hot plate is a hollow fitting 17 having inlets 18 and flap valves 19 preventing reverse flow. Supported on the fitting 17 is a stationary pipe 11 having a telescopic connection with an upper movable pipe 12a provided at its top with a float 20.

The hot plate 13 receives hot water through a pipe 14a provided with a valve 15a and discharges through a pipe 16a to the outside of the tank. Due to the fact that the hot plate is at a substantial height above the bottom of the tank, there is a separate device for heating the side walls, comprising a hot water pipe 55 entering the lower part of the tank and preferably formed into a plurality of successively higher coils before passing to the outside of the tank. In this form of the apparatus it is found desirable to guide the movable pipe 12a as by means of a collar 56 supported by arms 57 projecting from the peripheral walls of the tank. Otherwise the parts are substantially identical with parts of the first form and may be designated by the same reference numerals.

In operation of the second form of apparatus there is produced the same general effect as in the first form, the digested solids tending to settle into the lower part of the tank and the solids, in which there is active bacterial action with concomitant generation of gas, tending to rise to higher levels.

As illustrated in Fig. 5, instead of having a hot plate at the lower end of the stationary pipe, the heating of a stationary pipe 11a may be effected by means of an annular heating chamber 58 receiving hot water through an upper supply pipe 59 and discharging the water through a lower outlet pipe 60.

It should be understood that various changes may be made in construction and arrangement and that various features may be used without others without departing from the true scope and spirit of the invention.

Having thus described my invention, I claim:

1. In an apparatus of the class described, the combination with a tank, of a draft tube to assist in circulation of liquid in the tank and having a stationary lower end, means controlled by variations in level of liquid in the tank for varying the position of the top of the draft tube accordingly, and means for circulating liquid through the draft tube.

2. In an apparatus of the class described, the combination with a tank, of a draft tube to assist in circulation of liquid in the tank, means controlled by changes in liquid level in the tank for maintaining the top of the draft tube in the same relation with respect to the liquid level, means for varying the position of the top of the draft tube relative to the liquid level in the tank, and means for passing liquid through the draft tube.

3. In an apparatus for treating liquid, the combination with a digesting tank, of a draft tube with its upper end substantially at the level of liquid in the tank, means for producing an upward flow of liquid in said draft tube, means for supplying fresh liquid to the interior of the draft tube through the side thereof, and means for withdrawing digested material from the draft tube through the side thereof.

4. In an apparatus of the class described, the combination with a tank, of an extensible draft tube to assist in circulation of liquid in the tank and comprising a lower stationary part and an upper movable part, float means connected with said movable part to raise and lower the same in accordance with changes in the liquid level, and metns for circulating liquid through the draft tube.

5. In an apparatus of the class described, the combination with a tank, of an extensible draft tube to assist in circulation of liquid in the tank and comprising a lower stationary part and an upper movable part, a float attached to the upper end of said movable part of the draft tube to support the same, means for supplying liquid to the interior of the float to vary the buoyancy thereof, and means for circulating tank liquid through the draft tube.

6. In an apparatus for treating liquid, the combination with a digestion tank, of a draft tube, heating means including a hot plate at the bottom of said draft tube, means for supplying fresh liquid to the interior of said draft tube through the side thereof and means for withdrawing digested material from the draft tube through the side thereof.

7. In an apparatus of the class described, the combination with a tank, of a draft tube comprising a lower stationary part and an upper movable part, an inlet in the side of the tank, an outlet in the side of the tank, a flexible duct connected with said inlet and discharging into said movable part through the side thereof, and a flexible duct receiving liquid from said movable part and discharging through said outlet.

8. In an apparatus for treating liquid, the combination with a digestion tank, of a draft tube having inlet means at its lower end, means for preventing reverse flow through said inlet means, means beneath said inlet means, for heating the liquid and causing upward movement of the liquid through said draft tube, means for supplying fresh liquid to the interior of the draft tube through its side, and means for withdrawing digested material from the draft tube through its side.

9. In an apparatus for treating liquid, the combination with a digestion tank, of a draft tube having inlet means at its lower end, a hot plate beneath said lower end of the draft tube, means for supplying hot fluid to said hot plate, heating coils extending around the inside of said tank and connecting the hot plate with the outside of the tank, means for supplying fresh liquid to the interior of the draft tube through its side, and means for withdrawing digested material from the draft tube through its side.

10. In an apparatus of the class described, the combination with a tank having a side wall, of a draft tube having a movable upper portion, a float surrounding the top of said movable upper portion and attached thereto, deflecting means directing rising gases inwardly from the side wall and upwardly around said float, means for receiving said rising gases, and means for for breaking up scrum collecting on the surface of the liquid around said float and within said deflecting means.

11. In an apparatus of the class described, the combination with a tank having a side wall, of a draft tube having a movable upper portion, a float surrounding the top of said movable upper portion and attached thereto, deflecting means directing rising gases inwardly from the side wall and upwardly around said float, means for receiving said rising gases, and means for spraying liquid on the surface of the tank liquid around said float and breaking up any scum collecting at that location.

12. In an apparatus of the class described, the combination with a tank, having a side wall, of a draft tube having a movable upper portion, a float surrounding the top of said movable upper portion and attached thereto, deflecting means directing rising gases inwardly from the side wall and upwardly around said float, means for receiving said rising gases, and means for spraying liquid on the surface of the tank liquid around said float and breaking up any scum collecting at that location, such spraying means including a water ring and spray nozzles projecting therefrom.

13. In an apparatus of the class described, the combination with a tank, of an extensible draft pipe having an upper movable part and a lower stationary part having at its lower end an inlet receiving tank liquid, said lower end of the stationary part being at a higher level than the bottom of the tank, a hot plate just below said inlet, means for heating said hot plate, an inlet for raw sewage in the side of the tank at a higher level than the inlet for said stationary part of the draft tube, and means for withdrawing material from the tank at a lower level than said hot plate.

14. In an apparatus of the class described, the combination with a tank, of an extensible draft tube having an upper movable part, and a lower stationary part having at its lower end an inlet receiving tank liquid, said lower end of the stationary part being at a higher level than the bottom of the tank, a hot plate just below said inlet, an inlet for raw sewage in the side of the tank at a higher level than the inlet for said stationary part of the draft tube, means for withdrawing material from the tank at a lower level than said hot plate, means for supplying hot water to the hot plate, and separate tank-heating means including a hot-water coil extending around the tank from a level below the hot plate to a level above the hot plate.

15. The method of digesting sewage sludge and the like in a tank, comprising passing liquid up through the central part of the tank and down at the side of the tank by heating the lower central portion of the tank, diverting upwardly moving gas to the central part of the top of the tank for collection and removal, diverting supernatant liquid substantially freed from gas to the side of the tank, supplying fresh liquid to the upward flow of liquid through the central part of the tank and withdrawing digested material from the flow of liquid up through the central part of the tank.

PHILIP B. STREANDER.